US011980179B2

(12) United States Patent
Kauffman

(10) Patent No.: US 11,980,179 B2
(45) Date of Patent: May 14, 2024

(54) CONNECTED BAIT BOX

(71) Applicant: Woodstream Corporation, Lancaster, PA (US)

(72) Inventor: Matthew Kauffman, Lancaster, PA (US)

(73) Assignee: Woodstream Corporation, Lancaster, PA (US)

( * ) Notice: Subject to any disclaimer, the term of this patent is extended or adjusted under 35 U.S.C. 154(b) by 314 days.

(21) Appl. No.: 17/344,221

(22) Filed: Jun. 10, 2021

(65) Prior Publication Data

US 2022/0394970 A1 Dec. 15, 2022

(51) Int. Cl.
*A01M 25/00* (2006.01)
*A01K 5/02* (2006.01)
*G01D 5/24* (2006.01)

(52) U.S. Cl.
CPC ............ *A01M 25/004* (2013.01); *G01D 5/24* (2013.01); *A01K 5/0233* (2013.01); *A01K 5/0275* (2013.01); *H04Q 2209/40* (2013.01)

(58) Field of Classification Search
CPC .. A01M 25/00; A01M 25/002; A01M 25/004; G01D 5/24; A01K 5/0233; A01K 5/0275; H04Q 9/00; H04Q 2209/00; H04Q 2209/10; H04Q 2209/40; H04Q 2209/43; H04Q 2209/50; H04Q 2209/80; H04Q 2209/82; H04Q 2209/823; H04Q 2209/826; H04Q 2209/84
See application file for complete search history.

(56) References Cited

U.S. PATENT DOCUMENTS

| 10,600,024 | B2 * | 3/2020 | Smith | G05B 19/406 |
| 10,791,728 | B2 * | 10/2020 | Zirkle | A01M 31/002 |
| 10,897,887 | B1 | 1/2021 | Walsh et al. | |
| 10,947,101 | B2 * | 3/2021 | Asami | A47J 31/40 |
| 11,361,278 | B2 * | 6/2022 | Dattamajumdar | G06T 7/74 |

(Continued)

FOREIGN PATENT DOCUMENTS

| KR | 1020080097082 A | 11/2008 | |
| WO | WO-2012120263 A1 * | 9/2012 | A01M 25/004 |

OTHER PUBLICATIONS

International Search Report and Written Opinion from the International Searching Authority dated Oct. 10, 2022 corresponding to Application No. PCT/US2022/032779, 12 pages.

(Continued)

*Primary Examiner* — Franklin D Balseca
(74) *Attorney, Agent, or Firm* — Barley Snyder

(57) ABSTRACT

A rodent bait station comprises a housing defining at least one entrance, a bait holding area arranged within the housing for storing a quantity of rodent bait for consumption, and an electronics assembly. The electronics assembly includes a capacitor arranged proximate the bait holding area and having a characteristic capacitance indicative of the quantity of bait in the bait holding area, and a controller for measuring the characteristic capacitance of the capacitor. A processor of the electronics assembly estimates a quantity of bait in the bait holding area according to the measured characteristic capacitance, and transmits via a transmitter a wireless signal indicative of one of the measured characteristic capacitance or the estimated quantity of bait in the bait holding area.

23 Claims, 7 Drawing Sheets

(56) References Cited

U.S. PATENT DOCUMENTS

2006/0071774 A1* 4/2006 Brown .................. G07F 9/026
340/522
2017/0360026 A1 12/2017 Zirkle et al.
2020/0253186 A1 8/2020 Files et al.

OTHER PUBLICATIONS

International Preliminary Report on Patentability and Written Opinion dated Nov. 21, 2023, corresponding to Application No. PCT/US2022/032779, 8 pages.

* cited by examiner

CONNECTED BAIT BOX

FIELD OF THE INVENTION

The present invention relates to the field of pest control, and more particularly, to a rodent bait station or bait box having remote bait monitoring capability.

BACKGROUND

Rodent bait stations or bait boxes are commonly used as a passive method to control pests in both commercial and residential environments. A bait box typically consists of an enclosure holding a quantity of rodent bait therein (i.e., poisonous bait), which is consumed by rodents upon entering the enclosure. Bait boxes need to be checked/serviced on a regular basis by a pest control operator (PCO) in order to be cleaned out and/or have the bait replenished. As current bait boxes contain no electronic sensors or methods of data collection or communication, the PCO must physically go to the location and check each bait box to ascertain its condition, and perform appropriate servicing (e.g., cleaning, bait replenishing, etc.).

Accordingly, there is a need for more efficient systems and methods for monitoring a condition of a rodent bait box, including monitoring an amount of bait remaining and/or the cleanliness of the box.

SUMMARY

A rodent bait station according to an embodiment of the present disclosure comprises a housing defining at least one entrance and a bait holding area for storing a quantity of rodent bait, and an electronics assembly arranged within the housing. The electronics assembly includes a capacitor arranged proximate the bait holding area and having a characteristic capacitance indicative of the quantity of bait in the bait holding area, and a controller for measuring the characteristic capacitance of the capacitor. A processor of the electronics assembly is adapted to estimate a quantity of bait in the bait holding area according to the measured characteristic capacitance, and transmit via a transmitter a wireless signal indicative of one of the measured characteristic capacitance or the estimated quantity of bait.

According to another embodiment of the present disclosure, a rodent bait station includes a housing defining a bait holding area in an interior thereof. The bait holding area includes at least one bait post extending from the housing for holding a quantity of bait, and a capacitive sensor arranged proximate the bait post for measuring a capacitance associated with the quantity of bait in the bait holding area.

A method of operating a rodent bait station according to another embodiment of the present disclosure comprises the steps of measuring a capacitance associated with a bait holding area of the bait station, periodically estimating a quantity of bait in the bait holding area according to the measured capacitance, and wirelessly transmitting a status message to a remote receiver indicative of the estimated quantity of bait.

BRIEF DESCRIPTION OF THE DRAWINGS

The invention will now be described by way of example with reference to the accompanying figures, of which.

DETAILED DESCRIPTION OF THE EMBODIMENTS

Figure 1:
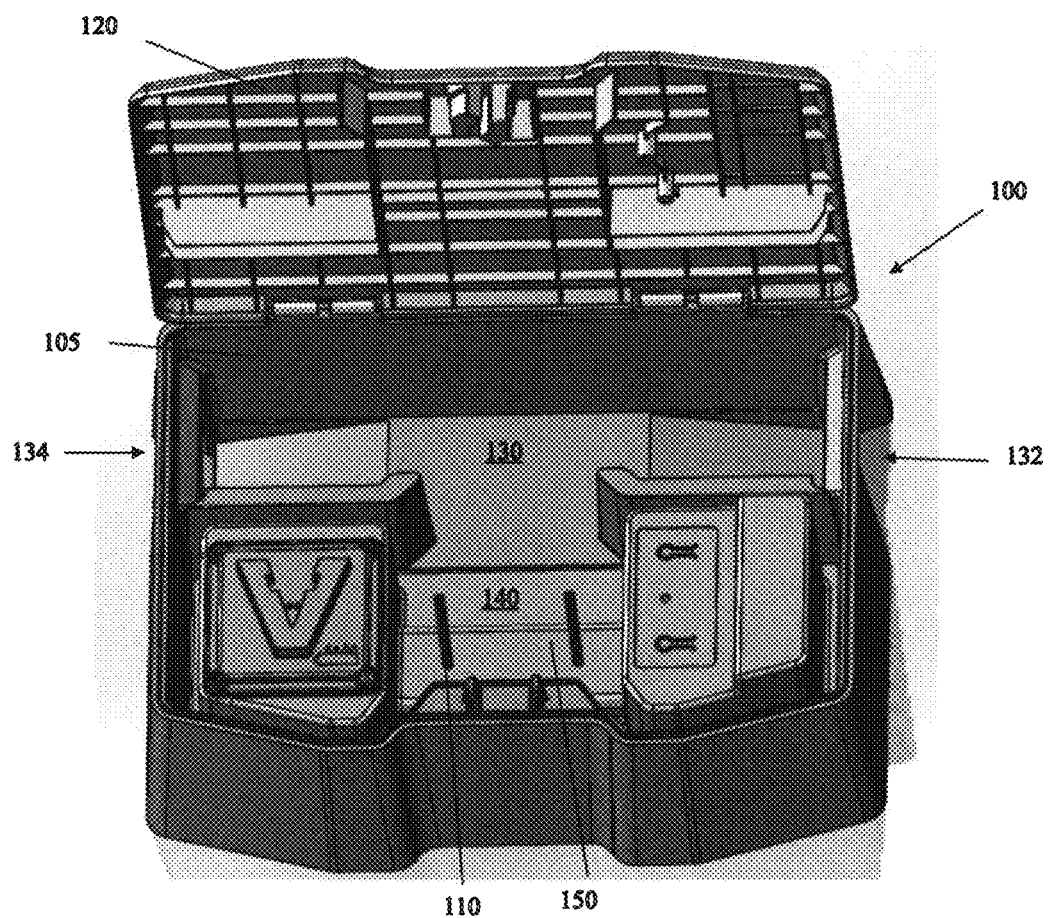
FIG. 1 is a perspective view of an exemplary bait box according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a bait box utilizing capacitive sensing to measure an amount of bait present in the box, as well as to detect the presence of other debris, and report this information to a PCO or other user via a wireless transmission and/or store the information for later analysis. In this way, a user must only travel to the location of the box for servicing after they are alerted to a low bait condition, or other irregularity, such as the need to be cleaned or otherwise emptied. The data collected may also be analyzed in order to determine, for example, the times and locations of rodent populations at a given site.

An exemplary simplified bait box 100 according to an embodiment of the present disclosure is shown in FIG. 1. The bait box 100 includes a housing 105 and a lid 120 for selectively covering an interior thereof. The housing 105 and the lid 120 may be constructed of any suitable material, such as plastic or other polymers. The housing 105 defines a tunnel 130 extending therethrough, including first and second openings 132, 134 at either end. A bait holding area 140 is positioned in communication with the tunnel 130 such that rodents entering the box have ready access to a quantity of bait held therein. The bait holding area 140 includes bait posts 110 (e.g., two) onto which bait is placed. The bait holding area 140 may be defined atop of a cover or floor 150 of the housing 105 that is also preferably constructed of a non-conductive material. As will be set forth in greater detail herein, arranged beneath or within the cover 150 is a capacitive sensor arrangement for sensing a capacitance indicative of an amount of bait remaining on the bait posts 110 at any given time.

Figure 2:
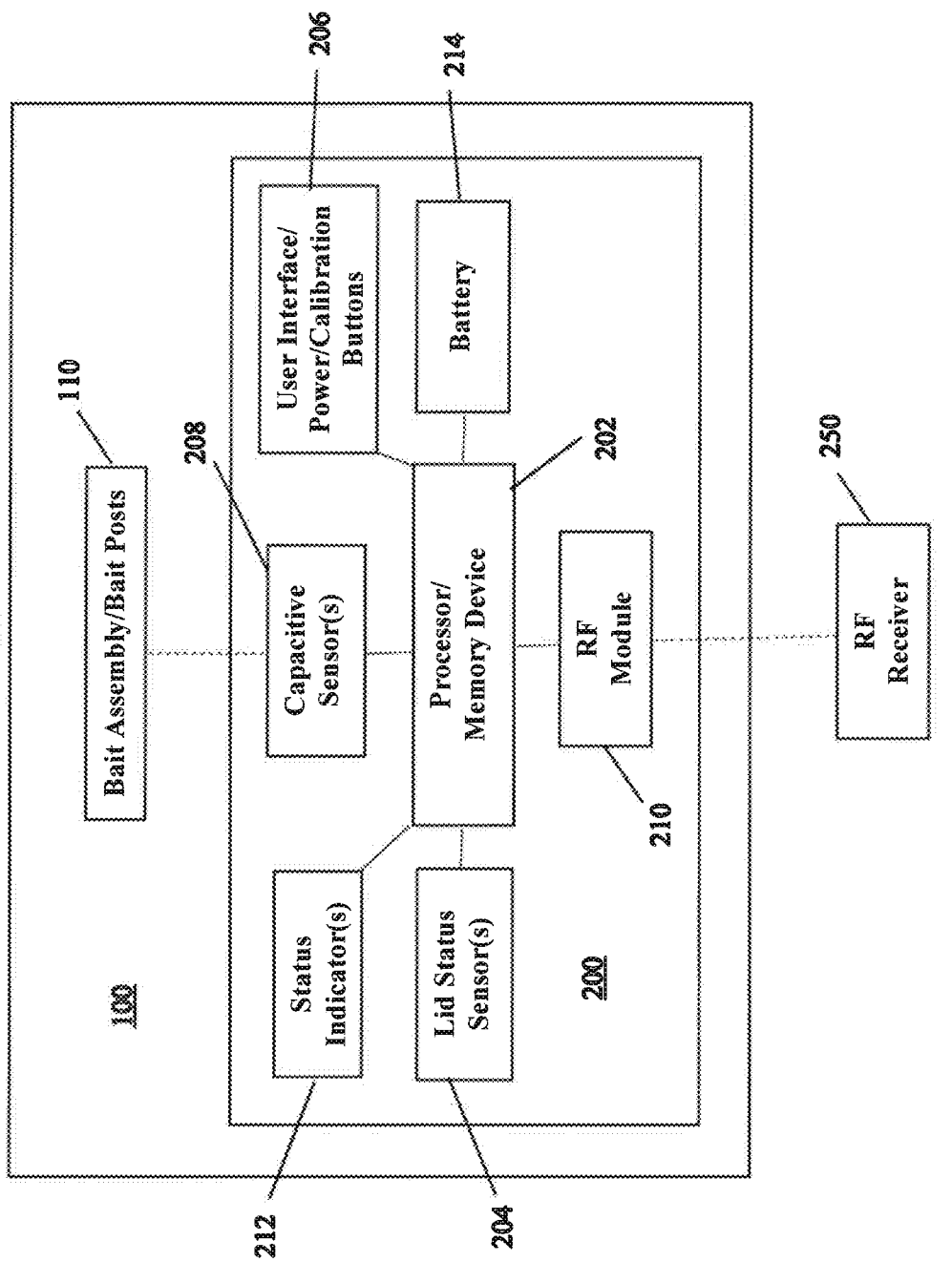
FIG. 2 is simplified schematic diagram of a bait box and associated electronics module according to an embodiment of the present disclosure.

Referring now to FIG. 2, the bait box 100 includes an electronics module or assembly 200. The exemplary electronics module 200 includes a central processor and associated memory device(s) 202. The processor is responsive to a set of program instructions stored on the memory device for performing the system operations set forth in detail herein, including the selective storage of measurements and other data onto the memory device. The memory device may take on one or more forms. In one embodiment, multiple memory devices are present, such as an on-board memory device, as well as removable memory device (e.g., an SD card). The electronics module 200 further comprises one or more lid status sensors 204 operatively connected to the processor 202 for detecting or monitoring the state of a lid of the bait box (i.e., open or closed). Such sensors may include, by way of example, a photo sensor, an electromechanical switch, or a magnetic switch, more specifically, a magnet attached to the lid and an accompanying Hall-effect sensor.

The electronics module 200 includes a user interface 206 comprising one or more input devices, such as buttons. In one embodiment, the user interface 206 includes at least a power button and a calibration button for turning the electronics module 200 on and off, and initiating a calibration function according to the embodiments set forth herein, respectively. In other embodiments, the user interface 206 may comprise only a power button, wherein calibration may be initiated by, for example, holding the power button in a depressed state for a predetermined period of time, or performing a predetermined sequence of lid openings and/or closings.

One or more capacitive sensors 208 is provided and operatively connected to the processor 202 for performing capacitance measurements indicative of an amount of bait in the bait box. As will be set forth in greater detail herein, the sensor(s) 208 may include one or more conducive pads or elements formed on a surface of a PCB which are operatively connected to a capacitive sensing integrated circuit (IC). The capacitive sensors 208 may be directly or indirectly coupled to a bait assembly including one or more bait posts 110 of the bait box onto which the bait is fixed.

The electronics 200 module further includes at least one status indicator 212, such as an LED indicator or a tone generator for outputting an audible signal. The status indicator 212 is adapted to give a user an indication of a condition of the bait box, such as indications of the success or failure of steps of the calibration process described in detail herein. The status indicator 212 may also be used to directly convey the status of the bait box at any given time. For example, in the event no bait is detected, the status indicator may be activated such that a user in direct access or close proximity to the trap is alerted to the trap condition. The electronics module 200 is powered by an on-board power source, such as a battery 214.

Still referring to FIG. 2, the electronics module 200 includes an RF module 210 (e.g., an RF transmitter or transceiver) by which the bait box 100 wirelessly communicates with an external receiver 250. The external receiver 250 may be a base station or network gateway operatively connected to the bait box 100 via a wireless network, or a receiver configured for direct communication with the RF module 210. In this way, the external receiver 250 may be connected to a plurality of bait boxes, all arranged within a given area (e.g., a grouping of bait boxes arranged on a commercial property). The gateway may be a public gateway operating on a protocol like that used with cellular devices in which cell phones communicate with cell towers not owned by the end user. Alternatively, the gateway and associated network may be private.

Communications between the RF module 210 and the external receiver or gateway 250 may be provided over a low power wide area network (LPWAN), such as a LoRa network, a Sigfox network, an Ingenu network, a Weightless network, or other network used to provide machine to machine connections in the manner described herein. According to embodiments, using frequencies of less than 1 GHz, the traps are capable of reporting their status to the external receiver 250 over a distance of at least one mile away, with communication capability ranges extending outwardly on the order of up to about ten miles away, without the use of repeaters. The transmissions may carry a payload of not greater than 256 bytes, which optimizes range and battery life. As a result, the system and method for the remote monitoring of bait boxes of the types described herein allows for the monitoring of large commercial, urban, agricultural and residential areas while obviating the need for an infrastructure including complex networks of devices and repeaters. By eliminating the need to install permanent network components, system setup is fast as well as easily modifiable.

Figure 3:
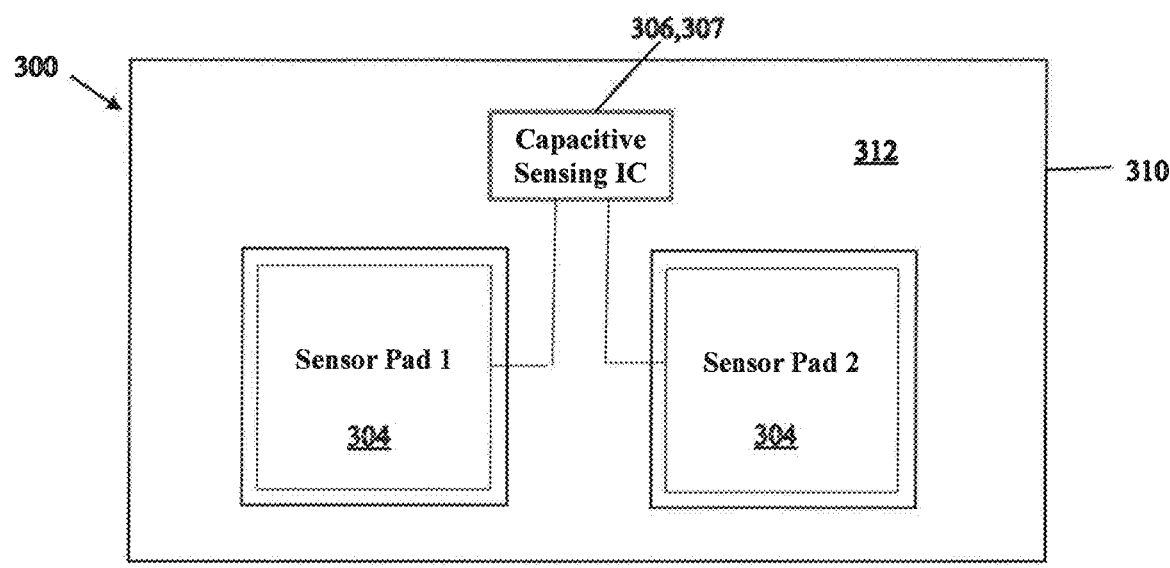
FIG. 3 is simplified diagram of a capacitive sensor arrangement according to an embodiment of the present disclosure.
Figure 4:
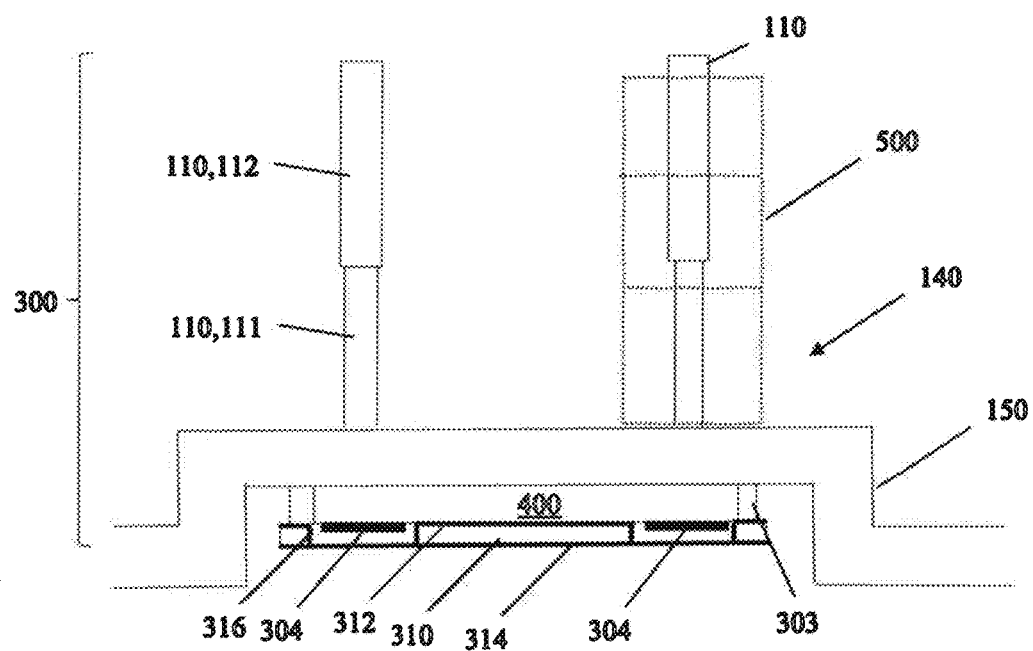
FIG. 4 is a side view of a bait holding area of a bait box including a capacitive sensor according to an embodiment of the present disclosure.

FIG. 3 is a simplified illustration of a portion of an exemplary capacitive sensor or capacitive sensor assembly 300. The sensor assembly 300 includes a PCB 310 having components of one or more capacitive sensors formed thereon. Specifically, each capacitive sensor may include a conductive pad 304, such as a copper pad, formed on a surface of or embedded within the PCB 310. The sensor(s) further include a controller, such as a capacitive sensing IC 306. The capacitive sensing IC 306 may be arranged on the PCB 310, and is in electrical communication with the one or more conductive pads 304 for detecting or measuring capacitance associated with each pad. More specifically, a capacitance is present between each conductive pad 304 and any semi-conductive material arranged proximate the pad, such as a quantity of bait arranged proximate the pad or the combination of the quantity of bait and a bait post supporting the bait. See, for example, the quantity of bait 500 and bait post(s) 110 as shown in FIG. 4. Accordingly, each capacitive sensor of the capacitive sensor assembly 300 includes a capacitor defined by the conductive pad 304 serving as a first conductor of the capacitor, and, for example, the quantity of bait or the quantity of bait and the bait post serving as the second conductor of the capacitor. In this way, each capacitor has a characteristic capacitance indicative of the quantity of bait arranged proximate its conductive pad 304.

In operation, the capacitive sensing IC 306 feeds a waveform to the conductive pads 304. Based on the characteristics of a reflected return waveform received by the IC 306, a capacitance between each of the conductive pads 304 and any semi-conductive materials (e.g., bait, debris, etc.) in close proximity thereto may be determined or measured. The measured capacitance varies according to the quantity of semi-conductive material in proximity to the pads 304. In this way, through calibration, an estimate of bait quantity or the presence of foreign matter in proximity to the sensor can be realized. While the sensor assembly 300 is described herein as having a controller in the form of a capacitive sensing IC, it should be understood that the controller can be any processor or processing component, or combination of components, suitable for outputting a signal indicative of a sensed capacitance influenced by a quantity of bait.

Referring now to FIG. 4, a simplified side view of the bait holding area 140 shown in FIG. 1 is provided. As set forth above, the housing of the bait box includes a raised floor or cover 150 in the bait holding area 140. The floor 150 defines a sensor space 400 thereunder for holding some of all of the above-described electronics module 200. In the exemplary embodiment, the PCB 310 of FIG. 3 (shown in cross-section) is mounted within the sensor space 400 and below the floor 150. In one embodiment, the location of the conductive pads 304 of the PCB 310 corresponds to or aligns with the location of the bait posts 110 in a vertical direction such that the pads 304 are arranged directly below the bait posts. The PCB 310 may be mounted to the underside of the floor 150 via standoffs 303, such that the conductive pads 304 of the PCB 310 are arranged at a predetermined distance from the bait posts 110, optimizing sensor performance. The right-side bait post 110 is illustrated with an exemplary quantity of bait 500 stacked thereon. As set forth above, the amount of bait 500 arranged on the bait post 110 affects a capacitive measurement performed by the capacitive sensing IC 306 between the associated conductive pad 304, and the bait 500 or the combination of the bait 500 and the bait post 110. While the bait posts 110 of the exemplary embodiment are mounted to or within the floor 150, it should be understood that the posts can be mounted in other orientations and to other features, such as horizontally from a sidewall of the housing or bait holding area, or vertically from a lid of the housing, by way of example only.

Still referring to FIG. 4, in one embodiment, the bait posts 110 are monolithic, and made from a conductive material such as aluminum or steel. In a particularly advantageous embodiment, sensing performance has been improved by implementing a multi-component bait post. More specifically, referring to the left-side bait post 110, this includes a first conductive post section 111 proximate the conductive pads 304, and a second non-conductive section 112 arranged at a distal end of the bait post 110 or conductive section 111. In one embodiment, the section 112 may comprise a plastic or otherwise non-conductive sleeve fitted over a free end of the first post section 111. The non-conductive sleeve or extension 112 has been shown to both improve performance of the capacitive sensing arrangement, as well as increase the amount of bait which may be fitted over the post 110.

Further performance improvements have been realized by shielding portions of the sensor assembly 300. For example, the PCB 310 includes an upper shielding layer 312 (e.g. a conductive layer, see also FIG. 3) formed on the top surface of the PCB and generally surrounding each conductive pad 304, and a lower shielding layer 314 formed continuously over a bottom surface of the PCB. The upper and lower shielding layers 312,314 may be connected by one or more conductive vias 316 extending through the PCB 310. The shielding layers 312,314 of the PCB 310 may be electrically connected to an external shield or shielding 307 of the capacitive sensing IC 306 arranged on the PCB 310, as shown in FIG. 3. The exemplary shielding acts to limit or minimize the influence of other surrounding components on the capacitance measured between the conductive pad(s) 304 and the bait 500, for example. Further, it should be understood that the shielding can be either active or passive. In the case of active shielding, the above-described shielding layers are connected to an input of the capacitive sensing IC 306, which uses capacitive measurements of the shielding layers to remove any influence they may have on the capacitance measurements associated with the bait 500, or more generally the bait holding area 140. In the case of passive shielding, the shielding layers may be connected to ground, or left unconnected.

Figure 5:
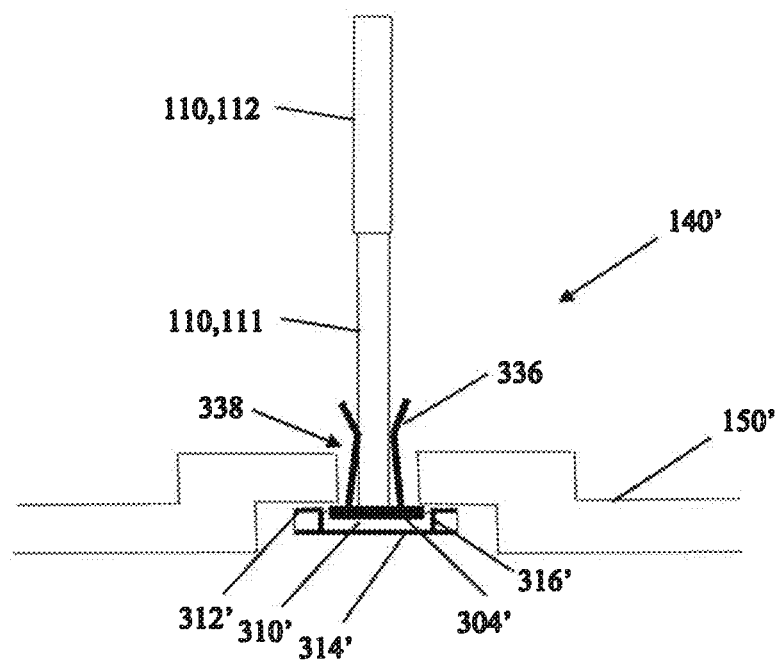
FIG. 5 is a side view of a bait holding area of a bait box including a capacitive sensor according to another embodiment of the present disclosure.

Referring now to FIG. 5, a bait holding area 140' according to another embodiment of the present disclosure includes one or more bait posts 110 placed in direct conductive contact with the pad 304' formed on the PCB 310'. More specifically, the floor or cover 150' includes one or more apertures 338 through which the bait post 110 extends. A conductive clamp-type mount 336 may be provided for fixing the bait post 110 in position both within the bait holding area 140', as well as in conductive contact with the PCB 310'. In one embodiment, the mount 336 may be in conductive contact with the PCB 310' or the conductive pad 304' thereof. In other embodiments, the bait post 110 may be mounted to the floor or cover 150', and directly electrically connected to the PCB 310' and/or pad 304' via other means, such as by wire, conductive contacts, and the like. Like the embodiment of FIG. 4, shielding layers 312',314' and vias 316' may also be formed on and/or within the PCB 310' as described above. In the embodiment of FIG. 5, the capacitor of the sensor assembly is defined by the conductive pad 304' and the bait post 110' serving as a first conductor of the capacitor, and bait arranged on the bait post (or other semi conductive material in proximity to the conductive pad and bait post) serving as a second conductor of the capacitor.

Figure 6:
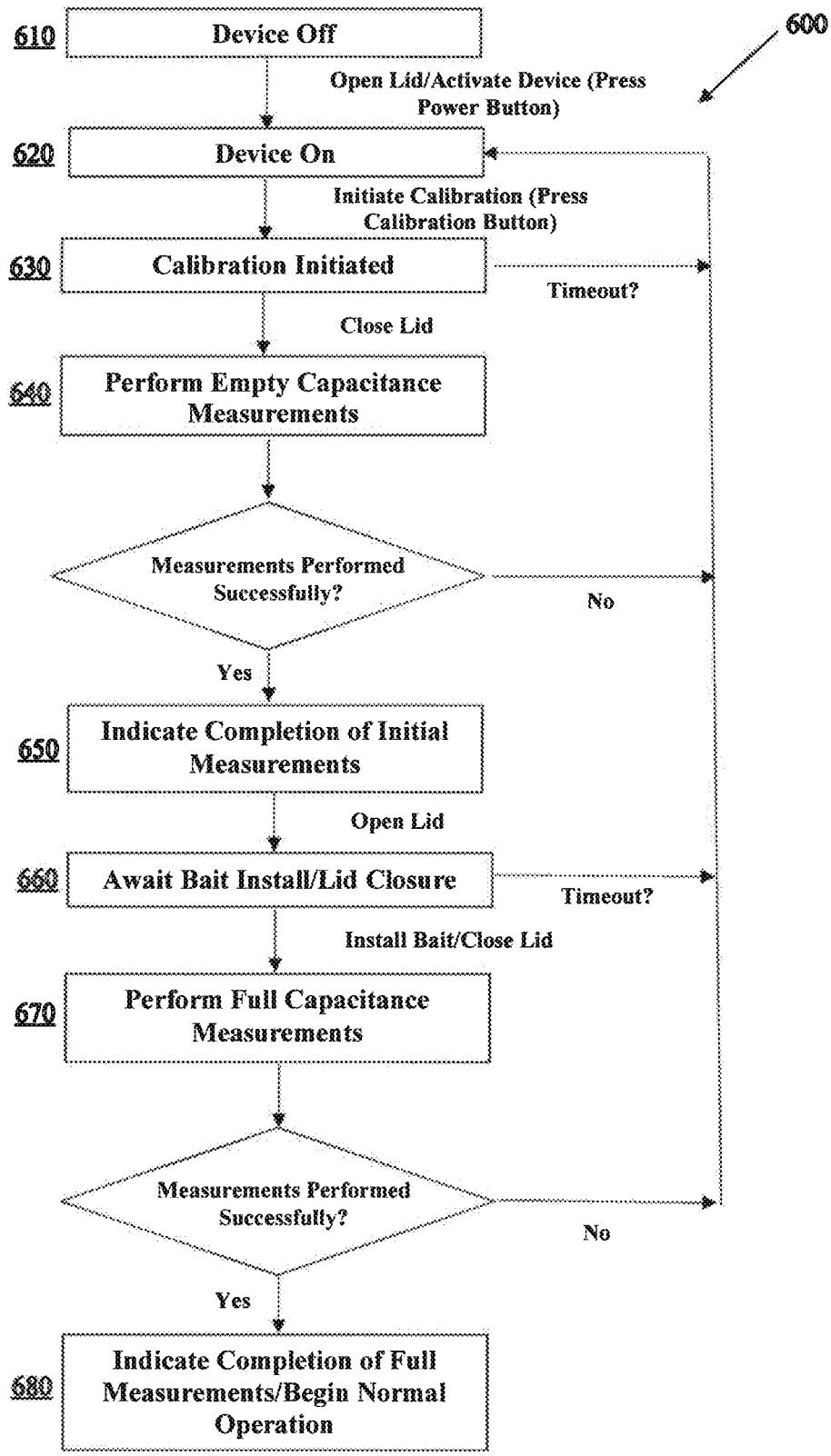
FIG. 6 is a process diagram illustrating a calibration routine of a bait box according to an embodiment of the present disclosure.

An exemplary calibration method 600 of a bait box according to an embodiment of the present disclosure is described with respect to FIG. 6. With the bait box empty, clean and powered off 610, a user may open the lid, and activate or power-on the bait box via the pressing of a power button. Once powered on 620, the bait box will perform a joining routine, establishing communication with the external receiver if not already connected. The bait box will also send a "start-up" message to the receiver, indicating that the device is powered on and connected. With the bait box powered on, the user initiates a calibration operation 630 by depressing a calibration button, by way of example only. In other embodiments, calibration may be automatically initiated upon a detected lid opening. Once calibration is initiated, the user has a predetermined period of time in which to close the lid, otherwise the calibration operation will timeout, and the bait box will return to the default on state 620. With the lid closed by the user within the predetermined period of time, the system performs empty capacitance measurements 640. The measurements may include numerous measurements made over a predetermined period of time. If the measurements are unstable or outside of a predetermined standard deviation or range, or if the lid is opened during the measurement process, the measurement process is deemed unsuccessful, and the bait box returns to the default on state 620. An indication of any errors is provided via the wireless connection to the external receiver and/or via an audio or visual indication on the bait box (e.g., the illumination of an LED indicator). If the measurements are suitably stable or consistent, and within a predetermined range, the system provides an indication of successful completion 650, such as a visual indication via status light, or an audible tone. Once indicated, the user opens the lid.

After the lid is detected as being opened, the bait box awaits lid closure 660 within a predetermined period of time. During this time, a user fills the bait box with bait, and closes the lid. If the lid closure is not detected within a predetermined period of time, the system will timeout, and return to the default on state 620. Upon filling and closing the lid, the bait box performs full capacitance measurements 670. The measurements may include numerous measurements made over a predetermined period of time. If the readings are unstable or outside of a predetermined standard deviation or range, if they do not deviate from the empty measurements by a predetermined amount, or if the lid is opened during the measurement process, the measurement process is deemed unsuccessful, and the bait box returns to the default on state 620. If the measurements are suitably stable or consistent, and are suitably differentiated from the empty measurements and within a predetermined acceptable range, the system provides an indication of successful completion 680, such as a visual indication via status light, an audible tone, and/or sends a message to the external receiver. Once completed, the bait box resumes or beings normal operation, periodically monitoring the bait level via the capacitance sensor. This periodic monitoring may include, for example, taking capacitive readings every hour, and providing daily reporting via the wireless/radio communications, as will be set forth in greater detail herein.

Figure 7:
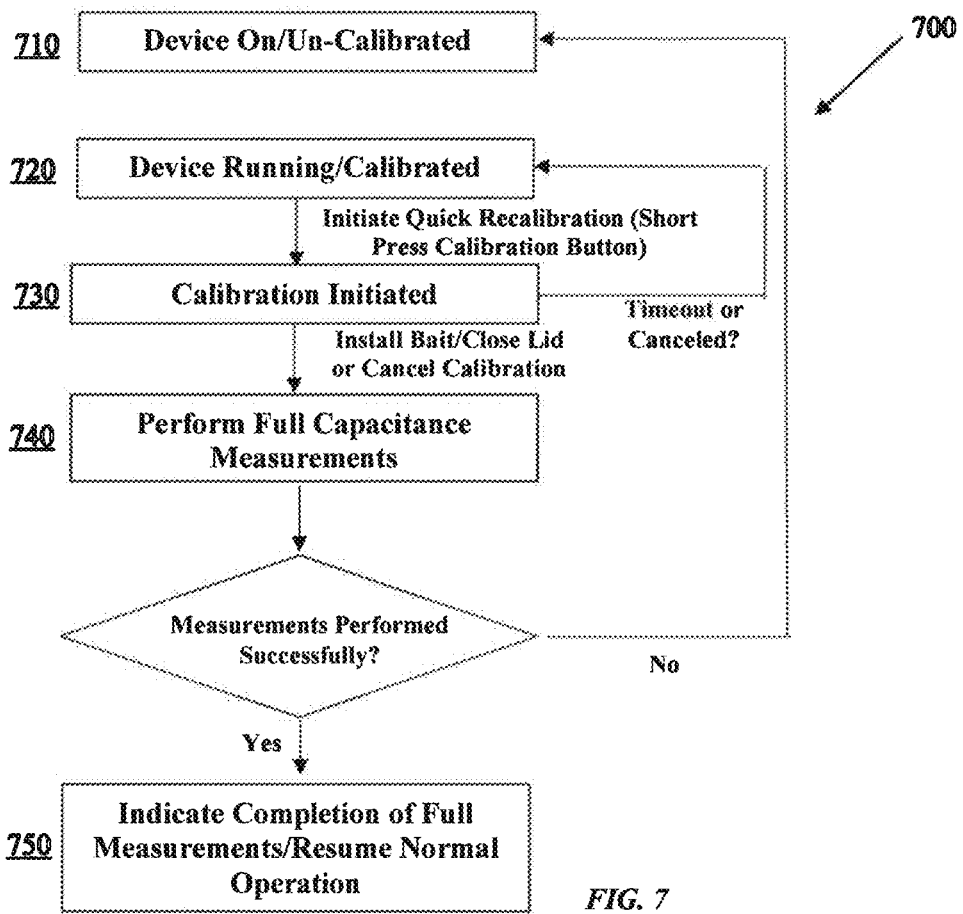
FIG. 7 is a process diagram illustrating another calibration routine of a bait box according to an embodiment of the present disclosure.

FIG. 7 illustrates a quick calibration process 700 according to an embodiment of the present disclosure, wherein a user can add bait to an already running/calibrated bait box, and quickly recalibrate its status to full. As shown, with a powered on/running bait box 720, the user fills the bait box and initiates the calibration process 730 (e.g., via a short press on a calibration button). Upon closure of the lid, the device performs capacitive measurements 740. If the measurements are successful (i.e., suitably stable or consistent, suitably differentiated from the empty measurements, etc.), the system provides an indication of successful completion 750, such as a visual indication via status light, an audible tone, and/or sends a message to the external receiver. If the readings are unstable or outside of a predetermined standard deviation or range, if they do not deviate from the empty measurements by a predetermined amount, or if the lid is opened during the measurement process, the measurement process is deemed unsuccessful, and the bait box returns to a default on/un-calibrated state 710 (see also state 620 of FIG. 6). While the above calibration routine or process 730 can be initiated by a button press, it can also be de-initiated or canceled by a second button press, thereby returning the trap to its previous state or calibration 720. In one embodiment, this cancelation function is only enabled while the lid is open and the trap is awaiting lid closure.

Figure 8:
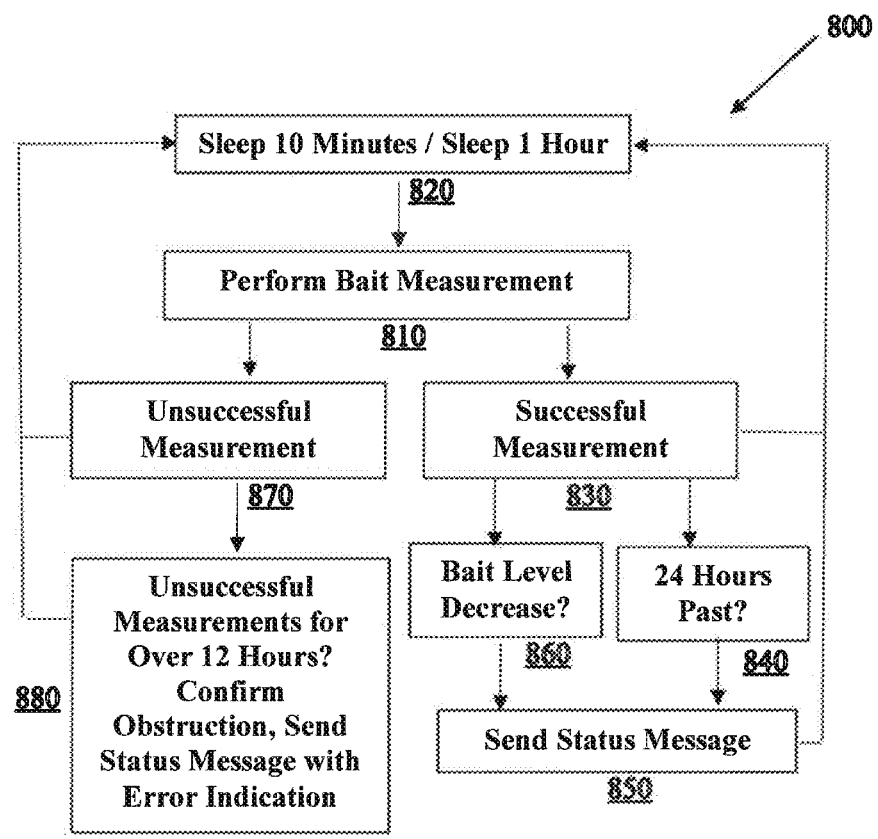
FIG. 8 is a process diagram illustrating an operating routine of a bait box according to an embodiment of the present disclosure.

Referring now to FIG. 8, a running or operating process 800 is provided which describes an exemplary method of operation of the bait box after calibration. Bait measurements 810 are performed periodically, such as every hour as implemented by a variable delay 820. In the event of a successful measurement 830 indicating no bait level change within a predetermined limit (e.g., within 25% of the last reading), the device continues performing bait measurements every hour. Upon the passage of 24 hours 840, a status message indicating the measured bait level is sent 850 to the remote receiver. In the event the bait level has decreased more than the predetermined limit after measurement 860, a status message is sent 850 to the remote receiver immediately. In the event that the bait measurement 810 is unsuccessful 870 (e.g., unstable, outside of a predetermined range, etc.), the device will sleep for another predetermined period of time or delay set by the variable delay 820 (e.g., 10 minutes), after which another measurement 810 is performed. By way of example, if an obstruction such as debris causes the measured capacitance to be outside of a predetermined acceptable range for over a predetermined period of time 880 (e.g., 12 hours), a status message including an error indication (e.g., an error bit) is sent to the remote receiver. In this way, capacitance changes resulting from the temporary presence of a rodent in the trap will not result in the sending of an alert message. However, the continued presence of a measured capacitance change indicative of debris or other permanent object in the bait box will be automatically sent to the remote receiver after the passage of the predetermined period of time. In one particularly advantageous embodiment, in the event of an unsuccessful measurement 870, during a first hour thereafter, for example, the device will perform measurements over a first shortened interval (e.g., every 10 minutes). After the first hour, however, the device will perform measurements over a second lengthened interval (e.g., every hour) if the unsuccessful measurements remain consistent. In this way, the trap recovers quickly from temporary obstructions or debris and resumes normal operation, while preserving battery life in the event of more permanent irregularities.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A rodent bait station, comprising:
   a housing defining at least one entrance and a bait holding area for storing a quantity of rodent bait; and
   an electronics assembly arranged within the housing, including:
      a capacitor arranged proximate the bait holding area and having a characteristic capacitance indicative of the quantity of bait in the bait holding area;
      a controller adapted to measure the characteristic capacitance of the capacitor;
      a processor adapted to estimate the quantity of bait in the bait holding area according to the measured characteristic capacitance; and
      a transmitter for transmitting a wireless signal indicative of one of the measured characteristic capacitance or the estimated quantity of bait in the bait holding area, the processor further adapted to, with the transmitter:
         generate and send status messages to a remote receiver indicative of the estimated quantity of bait; and
         generate and send a status message indicating a presence of a foreign object in an interior of the bait station to the remote receiver if the estimated quantity of bait falls outside of a predetermined range for a predetermined period of time.

2. The rodent base station of claim 1, wherein the capacitor is defined by a first conductor in the form of a conductive pad arranged proximate the bait holding area, and a second conductor in the form of at least semi-conductive material arranged proximate the conductive pad.

3. The rodent base station of claim 2, wherein the at least semi-conductive material defining the second conductor of the capacitor includes the quantity of bait in the bait holding area.

4. The rodent bait station of claim 1, wherein the processor is further adapted to:
with the controller, periodically estimate the quantity of rodent bait in the bait holding area according to the measured characteristic capacitance; and
with the transmitter, generate and send a status message to a remote receiver if the estimated quantity of bait has decreased by a predetermined amount.

5. The rodent bait station of claim 1, wherein the processor is further adapted to generate and send a status message to the remote receiver indicative of the estimated quantity of bait after a passage of a predetermined period of time.

6. The rodent bait station of claim 1, wherein, in response to a user initiating a calibration function of the electronics assembly, the processor is further adapted to:
perform at least one capacitance measurement with the controller indicative of the bait holding area containing no bait; and
perform at least one capacitance measurement with the controller indicative of the bait holding area being full of bait, the estimate of the quantity of bait is determined by the processor according to the capacitance measurement indicative of the bait holding area containing no bait and the capacitance measurement indicative of the bait holding area being full of bait.

7. A rodent bait station, comprising:
a housing;
a bait holding area for holding a quantity of bait;
a first bait post extending from a floor of the housing and into the bait holding area; and
a capacitive sensor assembly measuring a capacitance indicative of the quantity of bait in the bait holding area and including a printed circuit board having a first conductive pad formed thereon, the printed circuit board arranged under the floor of the housing such that the first conductive pad is arranged generally below the first bait post.

8. The rodent bait station of claim 7, wherein the capacitive sensor assembly further includes a capacitance sensing integrated circuit in electrical communication with the conductive pad and adapted to output a signal indicative of the measured capacitance.

9. The rodent bait station of claim 8, wherein the capacitive sensing integrated circuit is arranged on the printed circuit board.

10. The rodent base station of claim 9, further comprising a first conductive shielding layer arranged on a first surface of the printed circuit board and generally surrounding the first conductive pad, and a second conductive shielding layer arranged on a second surface of the printed circuit board opposite the first surface, the first and second conductive shielding layers electrically connected to a conductive shield of the capacitive sensing integrated circuit.

11. The rodent bait station of claim 7, wherein the first bait post comprises a conductive portion proximate the first conductive pad, and a non-conductive portion extending from an end of the conductive portion opposite the first conductive pad.

12. The rodent bait station of claim 7, further comprising:
a second conductive pad formed on the printed circuit board; and
a second bait post extending from the floor of the housing and into the bait holding area, the second conductive pad arranged generally below the second bait post.

13. The rodent bait station of claim 7, wherein the capacitive sensor assembly comprises a portion of an electronics assembly arranged within the housing for monitoring the quantity of bait in the bait holding area, the electronics assembly further including:
a processor in communication with the capacitive sensor assembly;
a user interface enabling a user to control at least one function of the bait station;
a lid status sensor for detecting an opened or closed state of a lid of the bait station; and
a wireless transmitter for transmitting an indication of a status of the bait station.

14. A method of operating a rodent bait station comprising steps of:
measuring a capacitance associated with a bait holding area of the bait station;
periodically estimating a quantity of bait in the bait holding area according to the measured capacitance;
wirelessly transmitting a status message to a remote receiver indicative of the estimated quantity of bait; and
wirelessly transmitting a status message indicating a presence of a foreign object in an interior of the bait station if the estimated quantity of bait falls outside of a predetermined range for a predetermined period of time.

15. The method of claim 14, wherein the step of wirelessly transmitting a status message is performed if the estimated quantity of bait has decreased by a predetermined amount.

16. The method of claim 14, further comprising a step of calibrating the bait station, including:
measuring a capacitance associated with the bait holding area with no bait present; and
measuring a capacitance associated with the bait holding area with a known amount of bait present,
wherein the quantity of bait is estimated according to the capacitance measurement associated with the bait holding area containing no bait and the capacitance measurement associated with the bait holding area containing the known amount of bait.

17. The method of claim 14, further comprising a step of providing an audio or visual indication to a user of a status of a calibration operation.

18. A rodent bait station, comprising:
a bait holding area adapted to hold a quantity of bait; and
a capacitive sensor assembly, including:
a first conductor; and
a second conductor arranged within the bait holding area, the capacitive sensor assembly adapted to measure a capacitance between the first conductor, and the second conductor and the quantity of bait in the bait holding area, the measured capacitance indicative of the quantity of bait in the bait holding area.

19. The rodent base station of claim 18, wherein the second conductor is adapted to directly support the quantity of bait thereon within the bait holding area.

20. The rodent base station of claim 19, further comprising a quantity of bait arranged within the bait holding area and supported directly on the second conductor.

21. The rodent bait station of claim 19, wherein the second conductor includes a bait post extending into the bait holding area from a housing of the bait station, the bait post holding the quantity of bait within the bait holding area.

22. The rodent bait station of claim 21, wherein the first conductor is arranged on a side of the bait post opposite the bait holding area.

23. The rodent bait station of claim 18, wherein a distance between the first conductor and the second conductor is fixed, and the bait station further comprises a processor operatively coupled to the capacitive sensor assembly, the processor determining the quantity of bait independent of the distance between the first conductor and the second conductor.

\* \* \* \* \*